Figure 1:
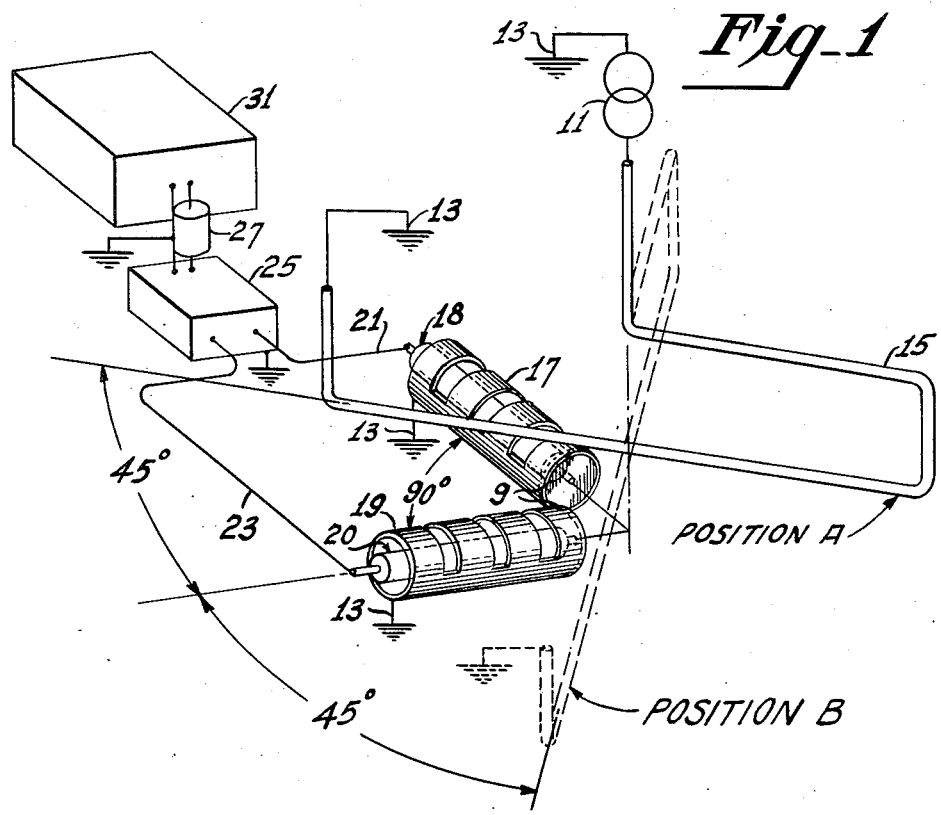

Oct. 5, 1954  O. McD. WOODWARD, JR  2,691,133
RADIO FREQUENCY MEASURING APPARATUS
Filed June 27, 1952  2 Sheets-Sheet 1

INVENTOR.
OAKLEY M. WOODWARD, JR.
BY Charles H. Brown
ATTORNEY

Oct. 5, 1954     O. McD. WOODWARD, JR     2,691,133
RADIO FREQUENCY MEASURING APPARATUS
Filed June 27, 1952     2 Sheets-Sheet 2

INVENTOR.
OAKLEY M. WOODWARD, JR.
BY Charles H. Brown
ATTORNEY

Patented Oct. 5, 1954

2,691,133

UNITED STATES PATENT OFFICE 2,691,133

RADIO FREQUENCY MEASURING APPARATUS

Oakley McDonald Woodward, Jr., Princeton, N. J., assignor to Radio Corporation of America, a corporation of Delaware Application June 27, 1952, Serial No. 295,962

13 Claims. (Cl. 324—58)

This invention relates to radio frequency measuring apparatus, and particularly to apparatus for indicating the ratio of balanced and unbalanced components of current in a transmission system.

In a radio frequency transmission system, the terms "balanced" and "unbalanced" refer to two different concepts. Where used in connection with a transmission line or a load, reference is made to the physical symmetry of the line construction with respect to ground or reference potential, or to the equality of the terminated load impedances with respect to ground. The terms "balanced" and "unbalanced" are also used, however, to denote the type of excitation or mode of operation. As used in this specification, the terms "balanced" and "unbalanced" refer to the latter definition.

Balanced or push-pull excitation is obtained where the currents on symmetrically located conductors are equal in magnitude and opposite in phase at all cross sections. This condition is a normal mode of operation of non-radiating, open wire transmission lines and shielded pair transmission lines with zero net current flow on the inside of the shield. Equal in-phase currents on the symmetrically located conductors are defined as the unbalanced or push-push components.

An object of this invention is to provide a measuring system for determining the relative magnitude of balanced and unbalanced current components in a radio frequency transmission system.

Another object of this invention is to provide simple and accurate measuring apparatus for indicating the ratio of balanced and unbalanced components of current through a transmission system.

Another object of this invention is to provide a fast operating and accurate measuring apparatus for determining balanced and unbalanced components of current in a transmission system, and which requires no special skill on the part of the operator.

Still another object of this invention is to provide a radio frequency measuring arrangement for determining the ratio of balanced and unbalanced complex currents in a transmission system, which arrangement is operable over a very wide frequency range.

Briefly, in accordance with the present invention, there is provided a radio frequency transmission measuring apparatus which contains two conductive members having lumped resistances therein to properly terminate the transmission system under test, and loop means electromagnetically coupled to, but electrostatically shielded from, the conductive members of the transmission system. The physical arrangement of this device is such that two measurements are taken: the total unbalanced components are measured in one operating adjustment, and the total balanced components are determined in a second operating adjustment. From these two measurements, the balanced or unbalanced efficiency of the transmission system may be directly determined.

Figure 2:
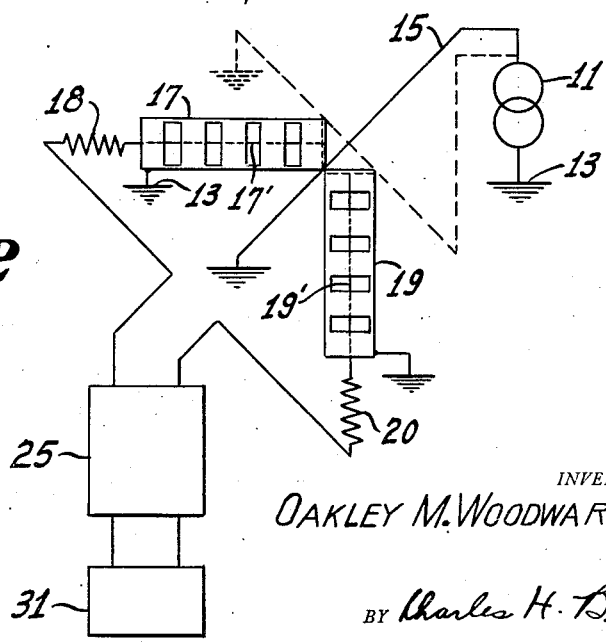
Figure 3:
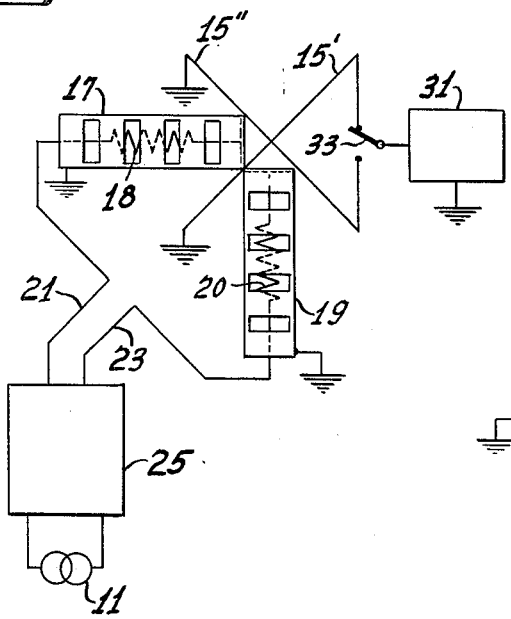
Figure 4:
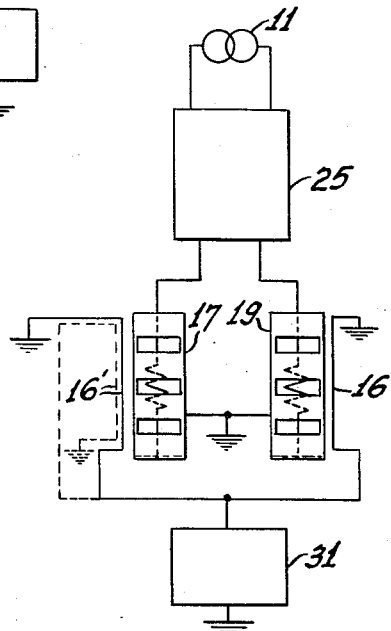
Figure 5:
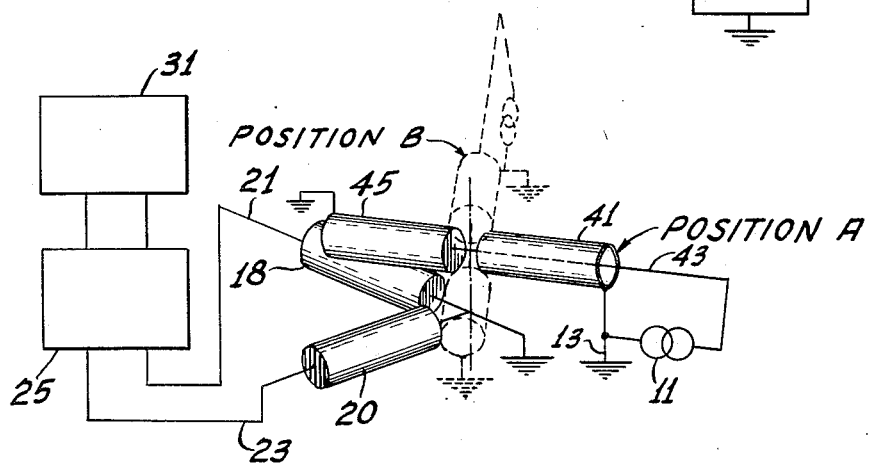

A more detailed description follows in conjunction with the accompanying drawing, in which:

Fig. 1 is a schematic arrangement of a radio frequency transmission measuring apparatus in accordance with the present invention;

Fig. 2 is an alternative physical arrangement of the apparatus shown in Fig. 1; and Figs. 3, 4 and 5 show modifications of the structure and circuitry of the apparatus of the present invention, Referring to Fig. 1, there is shown a perspective view, in which some of the components are shown schematically, of the transmission measuring arrangement of the present invention. A radio frequency generator 11 has one side connected to a point of reference or zero potential such as ground 13, and the other side connected to a conductive single turn loop 15. The end of the single turn loop 15 remote from the generator 11 is also preferably returned to the point of reference potential, or ground 13. The loop 15 is mechanically arranged to have two operating positions rotationally displaced 90° with respect to each other.

Two coaxial line structures 17 and 19 are in close physical relationship to the single turn loop 15. The outer conductors of the coaxial structures 17, 19 are tubular members which are slotted to permit substantially only inductive coupling between the single turn loop 15 and the elongated inner conductors of the coaxial line structures 17 and 19. The slotted tubular outer conductors act as electrostatic shielding means for the elongated inner conductors in the apparatus illustrated in Fig. 1. The inner conductors of the coaxial structures 17, 19 are conductively connected to the tubular outer conductors at the ends of the coaxial line structures 17 and 19 which are adjacent to each other, as indicated at 9 on the drawing. At the other ends of the coaxial line structures 17, 19, the inner and outer conductors are insulated from each other. The outer conductors of the slotted coaxial structures 17 and 19 are further connected to reference potential or ground 13. The inner conductive members of the coaxial structures 17 and 19 are conductively connected to the transmission system under measurement by physically symmetrical and equal length connection lines 21, 23.

To properly terminate the coaxial structures 17 and 19 so that they have an internal impedance equal to that of the transmission system under test, the inner elongated conductive members of the coaxial line structures 17 and 19 are preferably resistors 18 and 20 respectively. The ohmic value of resistance for each of the resistors 18 and 20 is made equal to half the nominal impedance of the transmission system under test so that the coaxial structures 17 and 19 appear as a matched generator or load (depending upon the character of measurements being taken). The resistors 18 and 20 need not be placed inside the slotted shield of the coaxial structures 17 and 19, but may assume other physical configurations as described below in conjunction with Fig. 2. The positioning of the resistors shown in Fig. 1, however, has the advantage that a very compact structure results which is physically symmetrical with respect to reference potential or ground 13.

The transmission system under test is indicated as a box 25 and is assumed, for the purpose of this discussion, to contain linear, passive, reactive elements. As an example, let it be assumed that the transmission system under test 25 is a balanced-to-unbalanced transmission line converter, usually termed a balun, which has a physically "balanced" input and a single-sided or physically "unbalanced" output, indicated as a coaxial cable 27, directly connected to a radio frequency measuring instrument 31, such as a radio frequency ammeter. By way of example only, the apparatus in box 25 shown on the drawing may take the form of the balanced-to-unbalanced converter of Patent No. 2,473,328 to George H. Brown and Oakley M. Woodward, issued June 14, 1949. It should be understood, however, that the invention may be used to test the transmission efficiency of any system carrying radio frequency energy, regardless of the type of network in box 25. The radio frequency measuring instrument 31 may be other suitable radio frequency transducer apparatus, such as a radio frequency amplifier and detector, depending upon the amplitude of radio frequency signals applied by the generator 11.

The two slotted coaxial line structures 17 and 19 are very much shorter than a wavelength physically, so that the radio frequency currents induced in the inner conductors thereof by the inductive relationship of the loop 15 will be substantially in phase throughout the length of both structures 17, 19. The two positions of the loop 15, denoted as position A and position B, are arranged as follows: In position A, the loop 15 lies in a plane which bisects the 90° angle between the two coaxial structures 17 and 19 and is normal to the plane of the coaxial structures 17 and 19. Thus, the loop 15 makes an angle of 45° with each of the coaxial structures 17 and 19. The center of the loop is on the normal from the intersection of the inner conductors or the projection of the inner conductors of the coaxial structures 17, 19. When the loop 15 is rotated 90° to its position B shown in dotted lines on the drawing, the center of the loop 15 remains in the same place; that is, a normal projection of the center of the loop 15 into the plane of the inner conductors of the coaxial structures 17 and 19 still intersects the intersection of the actual or projected inner conductors of the coaxial structures 17, 19. The loop in position B also makes an angle of 45° with each of the coaxial structures 17, 19; but is rotated one quadrant from position A. To secure the necessary equal coupling between the loop 15 and each of the two coaxial structures 17 and 19 in both positions A and B, it might be noted that the straight bottom portion of the loop 15 (shown horizontally on the drawing) in either of its operative positions is in a plane parallel to and closely spaced to the plane of the coaxial structures 17 and 19. The axis of rotation of the loop 15 is therefore a common normal to these two planes and passes through the intersection of the inner conductors or the projection of the inner conductors of the coaxial structures 17 and 19.

The operation of the transmission measuring apparatus shown in Fig. 1 is as follows: With the loop in position A as shown, radio frequency currents in the loop from the generator 11 induce equal and in-phase components of current in the inner conductors of the coaxial structures 17 and 19 in a direction simultaneously away from or simultaneously toward the adjacent ends of the coaxial structures 17 and 19. With the loop 15 rotated 90° to position B, the currents induced in the inner conductors of one coaxial structure 17 are equal to but out-of-phase with those in the other coaxial structure 19, that is, when the instantaneous current in one coaxial structure 17 is toward the adjacent ends of the coaxial structure 17 and 19, the instantaneous current in the other coaxial structure 19 is away from the adjacent ends of the coaxial structure 17, 19. The rotation of the loop 15 serves to change the directional sense of coupling between the loop 15 and one coaxial structure 17 relative to the sense of coupling of the loop 15 and the other coaxial structure 19.

The voltages applied through the equal length connection lines 21, 23 to the transmission system under test 25 are therefore balanced, or push-pull, with the loop in position B, but unbalanced, or push-push, with the loop 15 in position A. The efficiency of propagation through the transmission system under test for the two modes of excitation can be directly determined from the ratio of the receiving end current or voltage.

In our example, where the transmission system under test 25 is a balun, the balanced-to-unbalanced conversion efficiency is measured in the following manner: Let a first condition be set forth that if unbalanced or push-push excitation be applied to the physically "balanced" input of the balun, this unbalanced mode will be totally suppressed for perfect conversion and there will be no resultant output current at the radio frequency measuring instrument 31. With push-pull excitation, the push-pull components are converted by the balun to single-sided, or push-push. The ratio of the sum and difference of these receiving end currents are a measure of balance conversion efficiency. It is logical and desirable, however, that the quality of balance efficiency be stated as a percentage, with perfectly balanced operation expressed as one hundred percent and complete unbalance as zero percent. Therefore, let the balance efficiency be defined as $$\text{Balance efficiency} = \frac{100}{1+R}$$

where R is the ratio of the magnitude of the receiving end current with the application of push-push excitation to the magnitude of the receiving end current with push-pull excitation.

The load current components are proportional to the input terminal voltages produced by the slotted coaxial line structures 17 and 19 separately. Since these terminal voltages are also dependent upon the generator internal impedance as well as the balun input impedance, then the ratio of receiving end currents, and hence the balance efficiency, is a function of the generator internal impedance.

In the apparatus of the present invention, the generator internal impedance is determined by the resistors 18 and 20. By constructing the apparatus of this invention using a standardized size resistor for each of the resistors 18 and 20, the internal impedance of the apparatus may be easily changed to any desired value by simply changing resistors. The transmission system under test 25 may therefore be tested by the apparatus of this invention with a generator having an internal impedance equal to the value for which the transmission system was designed.

Referring now to Fig. 2, there is shown an alternative physical arrangement of the apparatus of Fig. 1. The solid line and dotted line positions of the loop 15 correspond to positions A and B of Fig. 1. The difference in structure lies in the coaxial line structures 17 and 19 and the physical positioning of the resistors 18 and 20. In the arrangement of Fig. 2, the inner conductors of the coaxial line structures 17 and 19 are low resistance conductors 17', 19' devoid of concentrated impedance, and the resistors 18 and 20 which constitute the internal impedance of the generator for exciting the transmission system under test 25 are made external to the coaxial structure 17, 19. The inner conductors of the coaxial structures 17 and 19, rather than the resistors 18 and 20, constitute the elongated conductive members electromagnetically coupled to the loop 15.

With this positioning of the resistors 18 and 20, an easy change of the resistors 18 and 20 may be effected to match the transmission system under test 25. The theory and operation of the apparatus shown in Fig. 2 is identical with that explained above in conjunction with Fig. 1.

The form of the apparatus of the invention shown in Fig. 3 illustrates the use of the invention wherein the positions of the generator 11 and the radio frequency measuring apparatus 31 have been interchanged from those shown in Figs. 1 and 2. The single loop 15 is shown in Figs. 1 and 2 which was made rotatable to produce push-pull or push-push excitation in the connection lines 21, 23 is replaced, in this modification, by two identical loops 15' and 15" which are similar to loop 15 but arranged at right angles to each other and in close, equally-spaced relationship to the coaxial structures 17, 19. When two loops 15' and 15" are used, the center of each loop should lie on the normal to the intersection of the inner conductors of the coaxial structures 17 and 19, and be coupled in equal degree to both of the inner conductors.

A switch 33 is used to selectively connect one or the other of the two loops 15', 15" to the radio frequency measuring apparatus 31. In the apparatus of Fig. 3, the generator 11 may be connected, let us say, to excite the transmission system under test 25 in the balanced or push-pull mode. The slotted line structures 17 and 19 and loop system 15', 15" are used to measure the relative magnitude of the push-push and push-pull current components, respectively. The efficiency of balanced transmission throughout the transmission system under test 25 is then determined by the use of the formula given above in the description of the operation of the apparatus of Fig. 1.

Referring now to Fig. 4, there is shown a different physical arrangement of slotted lines 17 and 19 and loops 16, 16' associated therewith. One loop 16 is electromagnetically coupled to, but electrostatically shielded from, the inner conductor of one coaxial line structure 19 and is in spaced relation thereto. The other loop 16' is identical with the first loop 16 and is similarly positioned with respect to its associated coaxial line structure 17, but it is made rotatable about its axis so that the relative sense of coupling, and therefore the instantaneous currents induced therein, may be reversed 180° in phase. This reversal occurs when loop 16' assumes the position shown by the dotted line.

With the rotatable loop 16' in the position shown in the solid line in Fig. 4 of the drawing, push-push components of current induced in the two loops 16, 16' add with respect to the point of connection of the radio frequency measuring apparatus 31, while push-pull components are balanced out. With the second loop 16' rotated 180° into the position shown in dotted lines on the drawing, push-pull components add with respect to the point of connection to the radio frequency measuring apparatus 31, while push-push components are balanced out. From the ratio of these two current measurements, the percentage efficiency of balanced transmission through the transmission system under test 25 may be determined by the formula given above with respect to Fig. 1.

It should be understood that with either the physical arrangement of the device of Fig. 3 or that of Fig. 4, in which separate loops are used to excite or pick up radio frequency energy in the coaxial line structure 17 and 19, it is important that there be equal coupling between the inner conductors of the coaxial line structure 17 or 19 and the associated loops 15', 15", 16 and 16'. This condition can best be met by carefully and identically positioning the separate loops with respect to their associated slotted line structures.

In Fig. 5 there is shown a modification of the invention, partly in perspective, in which the electrical system is identical with that shown in Fig. 1. In this figure, instead of using separate shielding structures for the two connection lines 21 and 23, the loop itself is electrostatically shielded, but is electromagnetically coupled to, the transmission system. The shielded loop is composed of two portions. A first portion has an outer conductor 41 and an inner conductor 43. The outer conductor 41 is discontinuous at or near the electrical center of the shielded loop. The other portion is a tubular member 45 having an outside diameter approximately that of the outer conductor 41 of the first portion, but electrically connected to the inner conductor 43 of the first portion. The discontinuity between the tubular member 45 and the outer conductor 41 serves to provide electromagnetic coupling between the shielded loop and the connection lines 21 and 23 or the resistors 18 and 20, but at the same time supplies substantially complete electrostatic shielding.

Other than the physical organization of the electrostatic shielding between the loop structure and the space-quadrature disposed resistors 18 and 20, the device is identical with that described above in connection with Fig. 1. In operation, the shielded loop is made rotatable with two positions of operation like those described in conjunction with Figs. 1 and 2. Another way of explaining the position of the rotatable shielded loop 41, 43, 45 or the loop 15 of Fig. 1 with respect to the resistors 18 and 20 to insure equal coupling is as follows: The shielded loop 41, 43, 45 is rotatable in a plane. The axes of the two resistors 18 and 20 intersect and are closely positioned to the plane of the shielded loop. The angle of intersection of the two resistors 18 and 20 is arranged so that the orthographic projections of the axes of the two resistors into the plane of the shielded loop form 45° angles with the two positions of operation of the loop. Further, the projection of the intersection of the axes of the resistors 18 and 20 normal to the plane intersects the electrical center of the shielded loop 41, 43, 45. The simplest geometric form to secure this equal coupling is that explained in detail in connection with Fig. 1 wherein the loop is rotatable in a plane which is parallel to the plane containing the axes of the two resistors 18 and 20.

It will be apparent that two quadrature-positioned shielded loops may be used in the device of Fig. 5 with a switching means to select the loop for energization or pickup purposes, like the arrangement of Fig. 3. Further, the resistors 18 and 20, instead of being made part of the energy interchange circuit as shown in Fig. 5, may be placed external thereto with the equal-length connection lines 21, 23 extended to intersect in space quadrature relation in a manner similar to that shown in Fig. 2.

The transmission measuring apparatus of this invention in any of the physical forms shown in the figures of the drawing has several advantages. Using the present invention, an unskilled operator can determine quickly and accurately the balance or unbalance efficiency of a transmission device or system. The structure of the device is such that it is operable over an extremely wide frequency range. As long as the slotted line structures 17 and 19 or the resistors 18 and 20 and the loop are very much smaller than a wavelength, no problem of frequency sensitivity arises. Only when the physical dimensions of the loop, the slotted line structures, or the resistors approach one-quarter wavelength at the operating frequency does there arise any source of error in the measurements due to frequency sensitivity. For very low frequencies, a single turn loop may provide insufficient coupling between the portions of the apparatus for ordinarily sensitive measuring equipment. In such a case, it may be necessary to use a loop structure having a plurality of turns to increase the flux linkages between the loop and the slotted lines 17, 19, resistors 18, 20, or connection lines 21, 23. Alternatively, the radio frequency measuring instrument 31 may include a radio frequency amplifier to increase the working range of sensitivity of the measuring equipment.

In an actual embodiment of the invention shown diagrammatically in Fig. 1, both of the coaxial line structures 17, 19 were included in an enclosing housing made of several separate pieces of brass. The dimensions which follow correspond to like structures shown pictorially and schematically in Fig. 1. The inside diameter of the outer conductors of the coaxial structures 17 and 19 was 17/64 inch. The distance from the intersection of the inner conductors to the remote end of either of the slotted structures was ½ inch. There were six slots in the outer conductor which were 0.010 inch wide and spaced 0.030 inch center-to-center. The resistors 18 and 20 were Type EB ½ watt carbon resistors having an outside diameter of 0.14 inch and a length of 0.375 inch with axial leads. To match a 300 ohm transmission line, two 150 resistors were used. The resistors 18 and 20 were maintained coaxial with the slotted outer conductor by a torus of insulating material and had one axial lead electrically connected through a brass disc shorting block to the outer conductor. The other axial lead of each resistor extended to a terminal for connecting a transmission system under test. The loop 15 was of brass wire 1/16 inch in diameter. The straight bottom portion of the loop was 7/8 inch long and was made rotatable in a plane 3/16 inch from the plane of intersection of the axes of the two resistors.

What is claimed is:

1. In radio frequency measuring apparatus, the combination comprising two conductors, conductive loop means electromagnetically coupled in equal degree to both said conductors but electrostatically shielded therefrom, means to change the relative sense of coupling between said loop means and only one of said conductors, means for coupling said two conductors to a transmission system under test, and radio frequency transducer apparatus connected to said conductive loop means.

2. The combination as defined in claim 1 wherein said conductors are electrostatically shielded from said conductive loop by tubular members individual to each of said conductors, each of said tubular members surrounding its associated conductor and having a plurality of slots therein whereby electromagnetic coupling to said surrounded conductor is permitted.

3. The combination as defined in claim 1 wherein said conductors are electrostatically shielded from said conductive loop by said conductive loop means having two portions, one of said portions being a coaxial structure having a discontinuous outer conductor near the electrical center of said loop means, the other portion being a tubular member conductively connected to the inner conductor of said coaxial portion.

4. In a radio frequency transmission measuring arrangement, the combination comprising two elongated conductive members, conductive loop means electromagnetically coupled in equal degree to both said elongated conductive members but electrostatically shielded therefrom, means to change the relative directional sense of coupling of one of said elongated conductive members to said loop means in relation to the sense of coupling of the other of said elongated conductive members to the said loop means, means for coupling said two elongated conductive members to a transmission system under test, and radio frequency apparatus connected to said conductive loop means.

5. In a radio frequency transmission measuring arrangement, the combination comprising two elongated conductive members intersecting in space quadrature in a plane, conductive loop means in electromagnetically coupled relationship to said elongated conductive members but electrostatically shielded therefrom, the electrical center of said loop means being on the normal to said plane at said intersection, means to change the directional sense of coupling between said loop means and one of said elongated conductive members, means for coupling said two elongated conductive members to a transmission system under test, and radio frequency transducer apparatus connected to said conductive loop means.

6. The combination as defined in claim 5 wherein said means to change the directional sense of coupling between said loop means and one of said elongated conductive members comprises two loops physically disposed at right angles to each other and coupled in equal degree to said two conductive members, and a switch selectively connecting one or the other of said loops to said radio frequency transducer apparatus.

7. The combination as defined in claim 5 wherein said means to change the directional sense of coupling between said loop means and one of said elongated conductive members comprises a single-turn loop rotatable about an axis passing through the intersection of said conductive members and having two predetermined positions differing by 90° of rotation.

8. In a radio frequency transmission measuring arrangement, the combination comprising two elongated conductive members intersecting in space quadrature in a plane, conductive loop means in electromagnetically coupled relationship to said elongated conductive members but electrostatically shielded therefrom, said loop means having two positions, the first position of said loop means lying in a second plane normal to said plane of said conductive members and bisecting the angle between said conductive members, the second position of said loop means being in a third plane mutually normal to said plane of said conductors and said second plane, the electrical center of said loop means in both of said positions being on the normal to said plane of said conductive members at said intersection, means for coupling said two elongated conductive members to a transmission system under test, and radio frequency transducer apparatus connected to said conductive loop means.

9. The combination as defined in claim 5 wherein said two elongated conductive members are resistance elements.

10. The combination as defined in claim 5 wherein said two elongated conductive members are resistance elements, each of said resistance elements having an ohmic resistance equal to one-half the nominal impedance of said transmission system under test.

11. The combination as defined in claim 5 wherein said two elongated conductive members in electromagnetically coupled relationship to said loop comprise conductors devoid of concentrated impedance.

12. The combination as defined in claim 4 wherein said conductive loop means comprises two loops, one of said loops being coupled to one of said elongated conductive members and the other of said loops being coupled to the other of said elongated conductive members, and wherein said means to change the relative sense of coupling between said elongated conductive members comprises means to rotate one of said loops 180°.

13. The combination as defined in claim 8, wherein said conductive members are resistance elements.

References Cited in the file of this patent

UNITED STATES PATENTS

| Number | Name | Date |
|--------|------|------|
| 2,267,430 | Slezskinsky | Dec. 23, 1941 |
| 2,473,328 | Brown et al. | June 14, 1949 |
| 2,507,712 | Harrison | May 16, 1950 |